United States Patent Office 3,030,193
Patented Apr. 17, 1962

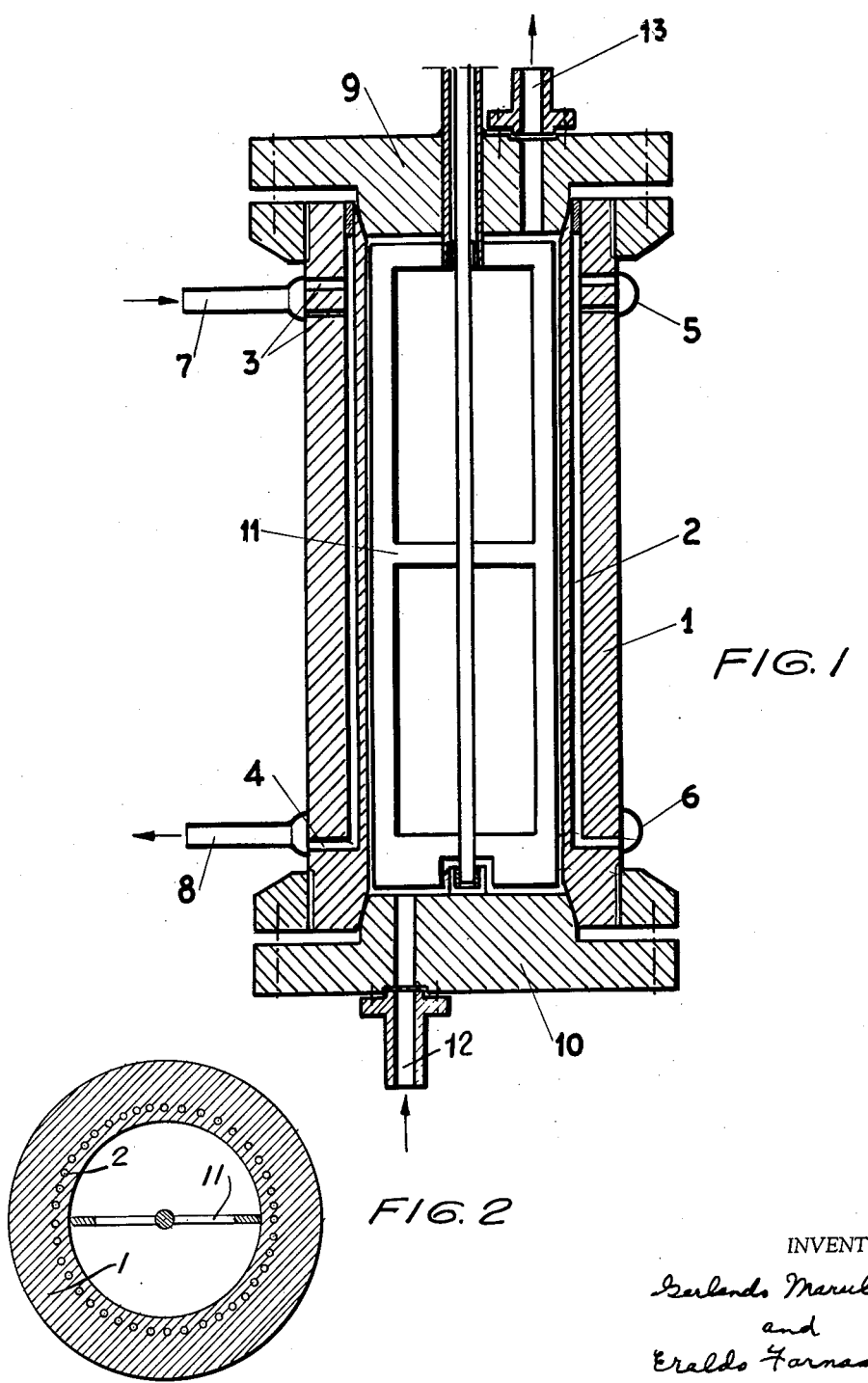

3,030,193
REACTOR FOR PREPARING MELAMINE
Gerlando Marullo and Eraldo Fornasieri, Milan, Italy, assignors to Montecatini Società Generale per l'Industria Mineraria e Chimica, Milan, Italy, a corporation of Italy
Filed Oct. 7, 1958, Ser. No. 765,768
Claims priority, application Italy Oct. 31, 1957
1 Claim. (Cl. 23—290)

This invention relates to the preparation of melamine from urea. It particularly relates to an improved apparatus, and a process, for preparing melamine, by heating urea under pressure, particularly under the pressure of anhydrous ammonia.

The invention constitutes an improvement in the procedures described in the copending application of Baroni, Garlanda, and Marullo, Serial No. 569,522, filed March 5, 1956. In that application a process is described in which the urea is subjected to a preliminary thermal treatment in order to avoid corrosion of the walls of a reactor consisting of, or lined inside with, Hastelloy C. A completely anhydrous urea product is pumped, in the molten state, into the reactor. The anhydrous urea does not cause any practically determinable corrosion of the walls of the reactor used. The reactor is preferably heated to 380°–420°. Urea and ammonia are fed together into the reactor, which is kept under a preferred ammonia pressure of 50 to 100 atm. Melamine is thus obtained in satisfactory yields, based upon the urea introduced.

However, the known reactors are generally deficient in respect to the mode of supplying the heat needed for the reaction. The heating of the reactors is carried out by applying heat to the outer surface of the wall by suitable means, such as condensing vapours, electric heating, etc. A relatively low thermal gradient is obtained thereby, resulting in a proportional decrease of production per unit of surface heated.

According to other systems the heating fluid pipes are placed in the wall of the reactor. Although a more effective heat exchange has been realized than in the aforementioned systems, nevertheless the problem is only partially solved. One of the reasons is that the surface of the heating pipe or coil, after a certain period of operation, is no longer in perfect or complete contact with the wall, due to the difference between the coefficient of thermal expansion of the coil and that of the wall. The advantage gained by the insertion of the heating pipe into the reactor wall is therefore partially annulled.

An object of the present invention is to provide a reactor for preparing melamine from urea, by which the aforementioned inconveniences are removed.

The reactor according to the present invention is simple in structure and is relatively economical. It makes possible the elimination of the temperature gradient in that portion of the thickness of the wall which is resistant to or sustains the internal pressure, and the resulting mechanical stresses. This permits the obtainment of a higher thermal gradient and of a proportional increase in the melamine production per unit of surface heated.

The reactor is essentially characterized in that a great number of longitudinal channels or bores having a small diameter, are placed at a short distance from its inner surface. In said channels condensing mercury vapour capable of supplying the heat amount needed for the reaction is circulated. The channels are prepared in the reactor walls by drilling, or by other suitable methods.

In the accompanying schematic drawing, FIG. 1 is a longitudinal section of a preferred form of the reactor constructed according to the present invention, and FIG. 2 is a horizontal section.

The pressure tube 1, consisting of heat-resistant steel (5% Cr and 0.5% Mg), is lined internally with an electrically applied alloy known as Hastelloy C, consisting of about 14% chromium, 58% nickel, 17% molybdenum, 6% iron and 5% vanadium. Channels 2 with a diameter of about 15 mm. are made in the thickness of wall 1, on a circumference having a diameter about 25 mm. greater than the inside diameter of the tube 1. The distance between the axes of said channels is about 30 mm. For a reactor having an inside diameter of about 300 mm. the thickness of the wall may be about 60–80 mm.

In communication with each channel 2 are the radial holes 3 and 4, provided respectively for the outlet and inlet of the condensing mercury vapours.

The collector rings or headers 5 and 6 communicate with the radial holes 3 and 4, being connected respectively with the mercury vapours inlet and outlet, by the corresponding outside pipes 7 and 8. The pressure tube 1 is closed at both ends by two flanges 9 and 10.

Urea is introduced, with ammonia for example, through the inlet pipe 12. The reaction product, essentially consisting of molten melamine and about 10% urea and intermediate products, is removed through the outlet pipe 13. The reacting mass is kept in agitation by stirrer 11 consisting of Hastelloy C.

The blades of stirrer 11 have the same length as the autoclave and are near the walls, being as close as possible, so that there is a high surface exchange coefficient due to the turbulence produced.

The reactor operates at a temperature of about 400° C. under a pressure of about 80 atom., although obviously this can be suitably varied.

Urea, melted at about 140° C., is pumped into the reactor in which the aforementioned reaction takes place, with the absorption of about 1,000 kcal./kg. melamine produced. This includes the reaction heat and the heat needed for heating urea from 140 to 380° C.

The mixture, having a melting point of about 340° C., is in the liquid state in the reactor under the said conditions.

The reacted mass, containing about 90% melamine, is then conveyed to another empty reactor (not shown) having an elongated shape, in which, by supplying the remaining heat needed, melamine with a higher content is obtained.

As said before, the heat is supplied to the reactor by mercury vapours condensing under about 3 atmospheres, through longitudinal channels bored in the walls of the reactor, as near inside, i.e., near the reacting mass, as possible.

Because the wall between the mercury and the reacting mass has a low thickness, there is a higher coefficient of heat transmission. The favorable effect of the decrease in this wall thickness is marked because the surface coefficients of the wall, both on the side of the reactants and on that of mercury, are very high, and therefore the total coefficient of heat transmission is practically inversely proportional to the wall thickness.

The invention is further characterized as comprising a reactor having its inner wall protected against the corrosion by an electrically applied lining of Hastelloy C alloy, for producing melamine from urea under a pressure of 50 to 100 atmospheres at temperatures between 350° and 600° C., and in that, in the heat and pressure-resistant steel wall of the reactor, longitudinal channels are bored at a short distance from the inner wall side of the reactor, in which channels condensing mercury vapours are circulated capable of supplying to the reacting molten mass the amount of heat required at the needed temperature.

We claim:
A reactor apparatus for preparing melamine by heat- ing urea under pressure of ammonia gas, comprising a pressure-retaining tubular metal member, closure members at both the top and bottom of said tubular member, a lining of Hastelloy C internally lining the tubular member, means to supply heat to the urea in the reactor comprising a plurality of bores disposed and formed within the wall thickness of said tubular member and extending longitudinally of the axis of the latter, said bores being situated closer to the inner wall of the tubular member than to the outer, and leaving at least the outer half of said wall thickness without said bores, so as not to weaken the pressure-sustaining strength of that half, one of said closure members having intake means for urea and ammonia communicating directly with the interior of the tubular member, the other of said closure members having exit means for product from said tubular member, said means to supply heat further comprising intake and exit means communicating with said bores, for introducing mercury vapor into said bores, and for removing condensed mercury therefrom, said bores being free of inner lining tubes so that the heat exchange is directly between the condensing vapor and the walls of the bores and between the inner lining of the tubular member and the material of the tubular member, and a rotary stirrer of Hastelloy C in said tubular member, the stirrer having rotary axis extending longitudinally of said tubular member, and having stirrer blades in close contact with and extending over at least the major part of the internal length of said tubular member.

References Cited in the file of this patent

UNITED STATES PATENTS

| | | |
|---|---|---|
| 2,402,905 | Miller | June 25, 1946 |
| 2,407,494 | Hartvigsen | Sept. 10, 1947 |
| 2,527,315 | Mackey | Oct. 24, 1950 |
| 2,762,682 | Van De Wateren | Sept. 11, 1956 |
| 2,772,860 | Nelson | Dec. 4, 1956 |

OTHER REFERENCES

Perry: (Chem. Eng. Handbook), 3rd ed., p. 1526, McGraw-Hill.